Dec. 7, 1948.  R. A. GARRETT  2,455,362
METHOD OF MAKING TEXTILE FIBER DRAFTING APRONS
Filed July 1, 1947

Inventor
Richard A. Garrett
by
Walter & Kaufman
Attorney

Patented Dec. 7, 1948

2,455,362

UNITED STATES PATENT OFFICE 2,455,362

METHOD OF MAKING TEXTILE FIBER DRAFTING APRONS

Richard A. Garrett, Lancaster Township, Lancaster County, Pa., assignor to Armstrong Cork Company, Lancaster, Pa., a corporation of Pennsylvania Application July 1, 1947, Serial No. 758,252

4 Claims. (Cl. 154—117)

This invention relates to a method of making textile fiber drafting aprons and is concerned particularly with the manufacture of such aprons having a cord type reinforcing. In the manufacture of this class of textile fiber drafting elements, an inner ply of elastic material, such as synthetic rubber, is provided, and there is disposed thereover a helical wrapping of reinforcing cord. An outer covering of an elastic material, preferably the same as the composition of the inner layer, is applied over the cords, and the whole unit is vulcanized, generally in open steam.

Common practice has been to apply the inner layer to a forming mandrel either as an extruded tube or as a sheet wrapped around the mandrel with a heat-welded joint where the edges of the sheet abut. The inner layer has been wetted with a solvent for the composition from which the layer is made, such as monochlorobenzene, where the inner layer is formed of a synthetic rubber of the butadiene-acrylonitrile type. The chord reinforcing has been then wound over the inner layer, using a conventional winding apparatus of the lead screw type commonly employed in screw-cutting lathes. Thereafter, the inner layer and the cord reinforcing applied thereto have been allowed to stand in open atmosphere until all of the solvent has evaporated. A sheet of synthetic rubber which is to serve as the outer wearing layer of the apron has been then coated on its inner surface with a solvent, such as monochlorobenzene, to render such surface adhesive or tacky. In some instances, it has been necessary to permit the solvent to partially evaporate, and, thereafter, the facing sheet has been wrapped over the layers previously applied to the mandrel. It has been necessary to permit the stocks on the mandrel to lie in the open atmosphere for a period of time sufficient for the residual solvent applied to the inner surface of the facing sheet to completely evaporate.

The reinforcing cord is generally wrapped in an open helical pattern so that the inner layer is exposed between the convolutions of the cord. This permits the formation of a bond between the inner layer and the outer layer, forming an integral unit upon vulcanization of the layers.

There are a number of problems involved in the manufacture of this type of apron, the principal ones of which will be discussed below.

In order to secure a satisfactory bond between the inner layer and the outer facing layer of the apron in the areas between the adjacent convolutions of the reinforcing cord, it is necessary to at least partially embed the cord into the body of the inner layer, for, otherwise, it would be very difficult to compress the outer layer over the cords and into the spaces between the convolutions. It is for this reason that the solvent mentioned above is applied to the inner layer. This permits a partial embedding of the cord into the body of the inner layer. The application of solvent, however, presents the problem of solvent evaporation; any solvent present between the layers at the time of vulcanization results in the formation of blisters and an imperfect bond in such areas. It is for such reason that it is necessary to allow for solvent evaporation after cord application and prior to the final vulcanization of the inner and outer layers. This increases the cost of manufacture of the product.

Another problem involved is that of maintaining a substantially uniform spacing of the convolutions of cord throughout the axial length of the material on the mandrel. There is a tendency for the cord to lag slightly behind the guiding eye which feeds the cord to the base layer on the mandrel, and there results a gradual building up of a small hump-like body of rubber in advance of the cord with a concomitant shortening of the distance between convolutions of the cord. This continues until the angle between the cord and the feeding mechanism is such that the cord will override the hump in front of it, and the spacing will be greater in such area. There is also some tendency for the cords to slip, particularly at the end of the winding operation on each mandrel.

A third major problem is that of initially holding the outer covering in proper position during subsequent fabricating operations. The outer layer must be held in engagement with the inner layer and over the cords, and since the stock is relatively nonadhesive in its untreated condition, difficulty has been experienced in maintaining the outer layer in such position during the conventional tape wrapping which is effected prior to open steam curing. It was also to overcome this problem that the inner surface of the outer layer was treated with a solvent to render it tacky, but this presented the further problem of solvent evaporation prior to vulcanization which has been discussed above.

It is an object of my invention to provide a method which will obviate the necessity for the use of volatile solvents in the fabrication of cord type textile fiber drafting aprons.

Another object of the invention is to provide a method by which the application of the outer facing layer will be facilitated by the tackification of the inner layer.

A further object of my invention is to provide a method which will insure that the cords as helically wrapped onto the inner layer will be embedded therein to the desired degree, will be uniformly spaced, and will be prevented from shifting laterally throughout the fabrication operations.

Further objects of my invention will become apparent upon further consideration of the detailed description of the invention which follows.

According to the preferred practice of the present invention, I apply the inner or base layer of resilient composition to the mandrel in the conventional manner and, thereafter, treat the cord with a nonvolatile plasticizing agent for the composition of the base layer, applying the cord to the base layer with the plasticizing agent passing from the cord to the base layer to soften the same and permit proper embedding of the cord into the base layer. The plasticizer is applied in a quantity sufficient that it will bleed or migrate from the cord into the composition of the base layer at the surface at least thereof throughout the extent of the area between adjacent convolutions. Thus, when the operation of wrapping the cords over the base layer has been completed, the entire surface of the base layer exposed between the cords will be in a tacky adhesive condition. Thereupon, the outer covering is wrapped around the inner layer over the cord, and the residual plasticizer in the cord causes the cord to be embedded into the facing layer upon the application of slight pressure. The base layer disposed between the convolutions of cord being tacky and adhesive serves to hold the facing layer in proper position for wrapping.

In order that the invention may be more readily understood, I will describe the same in conjunction with the attached drawing in which.

Figure 1:
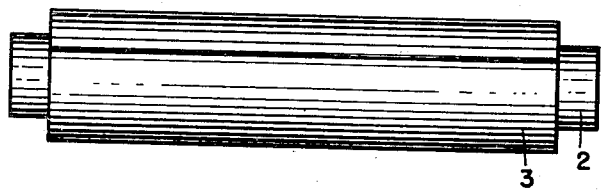
Figure 1 is a diagrammatic elevational view showing a mandrel with an inner layer applied thereover.
Figure 2:
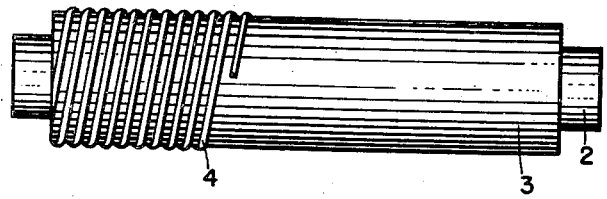
Figure 2 is a view similar to Figure 1 partially broken away and indicating the application of a helical wrapping of cord over the inner layer.

Referring to the drawing, the mandrel is indicated at 2 in Figure 1, and there is applied thereover an inner or base layer 3. The layer 3 is preferably formed of a butadiene-acrylonitrile copolymer generally designated as Buna N. This type of material is sold under various names, including "Perbunan," "Hycar," and "Chemigum," and the ratios of butadiene to acrylonitrile in these various products generally range between about 60 parts butadiene to 40 parts acrylonitrile to about 75 parts butadiene to 25 parts acrylonitrile. In place of Buna N, other synthetic rubbers may be employed. The particular composition employed is not critical so far as my method is concerned. Any flexible, resilient, wear-resistant, elastic composition which may be employed in the textile fiber drafting art may be used.

As previously pointed out, the preferred practice is to form the inner layer either as an extruded tube or as a wrapped sheet of uniform thickness disposed about the mandrel with a heat-welded abutting edge joint, as indicated in Figure 1.

Figure 5:
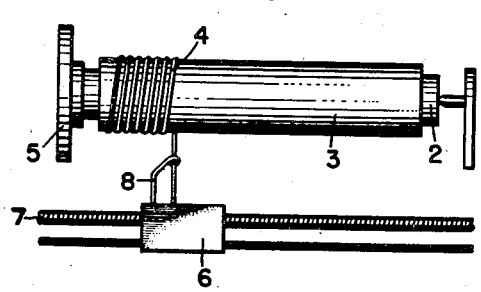
Figure 5 is a diagrammatic view illustrating the application of a cord reinforcing to an inner layer.

After the application of the inner layer 3, the cord reinforcing 4 is applied. The cord may be made of cotton, Nylon, rayon, silk, glass, or other material. Cotton is preferred because of its cheapness and ready availability. The application of the cord is preferably accomplished, as shown diagrammatically in Figure 5, where the mandrel 2 with the inner layer 3 disposed thereover is placed in a lathe 5 for rotation. The cord 4 is received within a receptacle 6 which is mounted for movement transversely of the mandrel 2 by a lead screw 7. A guiding eye 8 is attached to the receptacle 6, and upon rotation of the lathe mechanism 5, cord is fed from the receptacle onto the inner layer 3 positioned over the mandrel 2, the cord being disposed as a single helical winding.

Figure 4:
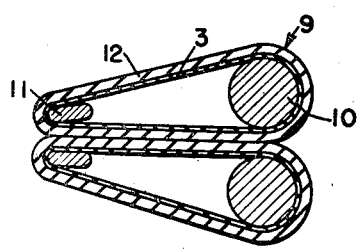
Figure 4 is an end view illustrating a pair of textile fiber drafting aprons, as used in the Whitin systems.

The size of the cord used will depend to some extent upon the size of the apron and the service to which it will be put. For a typical apron, such as the type disclosed in Figure 4 where the aprons 9 are driven by the middle pair of rolls 10 and pass over stationary nose bars 11, the inner layer may be about .020" thick, the cord may be 36/4 ply cotton, the cord being wrapped 36 turns per inch over the inner layer, and the outer layer may be about .040" thick. The apron may be 1½" wide and have an inside diameter of 1¼". The foregoing is merely a typical example of an apron. The sizes vary over a considerable range in both wall thickness and width and inside diameter. The method of my invention is applicable to all sizes and types of cord-reinforced aprons, regardless of the wall thickness or the size of the cord employed.

The receptacle 6 contains a bath of a material which is a nonvolatile plasticizer for the composition of the layer 3. Where the layer 3 is formed of a butadiene-acrylonitrile copolymer, the plasticizer may be dibutyl phthalate, tricresyl phosphate, or other nonvolatile plasticizing agent, such as the triacetic acid ester of glycerine, known as triacetin. The low polymer of coumarone and indene, one of which is known as dipolymer oil, may also be used for this purpose, as well as the nonvolatile coal tar derivative type of plasticizers.

If the composition be of a material other than Buna N, it will be necessary, of course, to use an appropriate plasticizer for the composition.

While I prefer to dip the cord into a bath of the plasticizer, the plasticizer may be otherwise applied to the cord or to the inner layer of composition prior to the application of the cord. By dipping the cord in the plasticizer, a uniform distribution of the plasticizer throughout the length of the covering on the mandrel is obtained, and rapid and proper penetration of the cord into the base layer is secured. It is for such reasons that I prefer to follow that practice.

Figure 3:
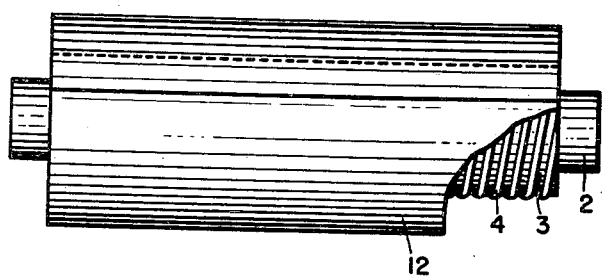
Figure 3 is also a view similar to Figures 1 and 2 partially broken away and showing the application of a facing layer over the inner layer and cord reinforcing.

Immediately after the application of the cord to the inner layer, an outer facing lever 12 is applied, as indicated in Figure 3. The outer layer is preferably formed of a composition similar to the composition of the inner layer. Where a Buna N type composition is used for the inner layer 3, a similar composition is preferably used for the outer layer, although for some particular uses, it is possible to use a modified type of composition in the inner and outer layers, depending upon the service to which the apron will be put in use. If there be two different types of composition employed, it may be desirable or necessary to treat the inner surface of the facing layer 12 with a nonvolatile plasticizer for the composition of the facing layer to obtain proper embedding of the cord and a good initial adhesive bond between the layers. Where both the inner layer 3 and the facing layer 12 are of the same or similar compositions, such application of plasticizer to the inner surface of the facing layer is not necessary but may, of course, be made if desired, for it does not delay the operation because the facing sheet may be immediately applied and vulcanization accomplished without waiting for solvent evaporation.

The outer layer may be formed as an extruded tube which is blown up and placed over the inner layer and cords on the mandrel. In larger size aprons, conventional practice is to form a sheet of uniform thickness for the outer layer and wrap it over the inner layer, including the cord reinforcing, an overlap joint being provided, as indicated in Figure 3. With my method, the application of the outer layer may be effected immediately upon completion of the winding operation. As a matter of fact, this practice is preferred. The plasticizer which is applied to the cord renders the surface of the inner layer between the cord tacky and adhesive, and upon the wrapping of the outer layer thereover and the application of a slight pressure, a bond is obtained between the inner and outer layers, the cord being embedded into the outer layer so as to bring the two layers into good contacting engagement throughout the length of the layers on the mandrel. The composite unit is placed under pressure by the use of wet fabric wrapping tape, as customarily practiced in the rubber industry for maintaining laminae of rubber in engagement during open steam vulcanization. The elements may be molded under pressure and vulcanized in the molds, but the open steam method is generally preferred because of the high cost of molds.

Upon completion of the wrapping operation, the unit is placed in an open steam vulcanizer and cured. With a Buna N type rubber, the vulcanization may be effected in about 50 minutes at 300° F. The fabric tape is then removed. The mandrel is extracted and the tube permitted to cool. Thereafter, the tube may be placed upon a mandrel and the outer surface buffed to the desired smoothness, the required wall thickness obtained, and the tube cut into aprons of the desired width.

The term "nonvolatile plasticizer" is used in the specification and claims in its generally recognized sense to include not only plasticizers such as those listed above but also others of a similar nature which do not evolve a gas in a sufficient quantity to deleteriously affect the finished product as by the creation of blisters, for example. It is well known that these plasticizers do have a small vapor pressure and do volatilize to a substantial extent at elevated temperatures, above those encountered in fabrication, but for all practical purposes they are nonvolatile at the temperatures employed in curing or vulcanization. Thus, they distinguish from solvents such as monochlorobenzene which are wholly volatile at temperatures below those attained in curing or vulcanization.

While I have illustrated and described a preferred embodiment of my invention, it will be understood that the same may be otherwise embodied and practiced within the scope of the following claims.

I claim:

1. In a method of making a cord reinforced textile fiber drafting apron, the steps comprising positioning a base layer of flexible, resilient, wear-resistant, vulcanizable composition upon a forming surface, wetting a reinforcing cord with a migratory plasticizer for the composition, which plasticizer is nonvolatile at vulcanizing temperatures, disposing said treated cord as an open helical covering over said base layer under tension to embed said cord into said base layer upon softening of said composition by said plasticizer, permitting said plasticizer to migrate into said composition in the area between adjacent turns of said reinforcing cord to soften and tackify said composition in such areas, applying a facing layer of flexible, resilient, wear-resistant, vulcanizable composition over said base layer and cord while said cord is wet with said plasticizer and said base layer is in a soft and tackified condition, transferring plasticizer from said cord to said facing layer to soften said facing layer, applying pressure to said assembly to bring said base and facing layers into intimate contact, and vulcanizing said base layer and facing layer to form an integral structure with said facing and base layers joined to said cord and to each other in the spaces between adjacent turns of said cord.

2. In a method of making a cord reinforced textile fiber drafting apron, the steps comprising positioning a base layer of unvulcanized butadiene acrylonitrile synthetic rubber upon a forming surface, wetting a reinforcing cord with a migratory softening agent for said butadiene acrylonitrile synthetic rubber, which agent is nonvolatile at vulcanizing temperatures, disposing said treated cord as an open helical covering over said base layer under tension to embed said cord into said base layer upon softening of said butadiene acrylonitrile synthetic rubber by said softening agent, permitting said softening agent to migrate into said butadiene acrylonitrile synthetic rubber in the area between adjacent turns of said reinforcing cord to soften and tackify said butadiene acrylonitrile synthetic rubber in such areas, applying a facing layer of butadiene acrylonitrile synthetic rubber over said base layer and cord while said cord is wet with said plasticizer and said base layer is in a soft and tackified condition, transferring plasticizer from said cord to said facing layer to soften said facing layer, applying pressure to said assembly to bring said base and facing layers into intimate contact, and vulcanizing said base layer and facing layer to form an integral structure with said facing and base layers joined to said cord and to each other in the spaces between adjacent turns of said cord.

3. In a method of making a cord reinforced textile fiber drafting apron, the steps comprising positioning a base layer of vulcanizable synthetic rubber composition upon a forming surface, wetting a reinforcing cord with a migratory plasticizer for the composition, which plasticizer is nonvolatile at vulcanizing temperatures, disposing said treated cord as an open helical covering over said base layer under tension to embed said cord partially into said base layer upon softening of said composition by said plasticizer, permitting said plasticizer to migrate into said composition in the area between adjacent turns of said reinforcing cords to soften and tackify said composition in such area, applying a facing layer of vulcanizable synthetic rubber composition over said base layer and cord while said cord is wet with said plasticizer and said base layer is in a soft and tackified condition, embedding the unembedded portion of said cord into said facing layer softened by the action of said plasticizer transferred from said cord to said facing layer, applying pressure to said assembly to bring said base and facing layers into intimate contact, and vulcanizing said base layer and facing layer to form an integral structure with said facing and base layers joined to said cord and to each other in the spaces between adjacent turns of said cord.

4. In a method of making a cord reinforced textile fiber drafting apron, the steps comprising positioning a base layer of flexible, resilient, wear-resistant, vulcanizable synthetic rubber composition upon a forming surface, wetting a reinforcing cord with a migratory softening agent for the composition, which agent is nonvolatile at vulcanizing temperatures, disposing said treated cord as an open helical covering over said base layer under tension to embed said cord into said base layer upon softening of said composition by said softening agent, permitting said plasticizer to migrate into said composition in the area between adjacent turns of said reinforcing cord to soften and tackify said composition in such areas, applying a facing layer of flexible, resilient, wear-resistant, vulcanizable, synthetic rubber composition over said base layer and cord while said cord is wet with said softening agent and said base layer is in a soft and tackified condition, transferring softening agent from said cord to said facing layer to soften said facing layer, applying pressure to said assembly to bring said base and facing layers into intimate contact, and vulcanizing said base layer and facing layer to form an integral structure with said base and facing layers joined to said cord and to each other in the spaces between adjacent turns of said cord.

RICHARD A. GARRETT.

REFERENCES CITED

The following references are of record in the file of this patent:

UNITED STATES PATENTS

| Number | Name | Date |
| --- | --- | --- |
| 2,377,316 | Billmeyer | June 5, 1945 |
| 2,427,197 | Cox | Sept. 9, 1947 |
| 2,427,198 | Frisco | Sept. 9, 1947 |

FOREIGN PATENTS

| Number | Country | Date |
| --- | --- | --- |
| 659,368 | Germany | May 2, 1938 |

Certificate of Correction

Patent No. 2,455,362. December 7, 1948.

RICHARD A. GARRETT

It is hereby certified that errors appear in the printed specification of the above numbered patent requiring correction as follows:

Column 3, line 52, for "systems" read *system*; column 4, line 62, for the word "lever" read *layer*;

and that the said Letters Patent should be read with these corrections therein that the same may conform to the record of the case in the Patent Office.

Signed and sealed this 22nd day of March, A. D. 1949.

[SEAL]

THOMAS F. MURPHY,
*Assistant Commissioner of Patents.*